United States Patent
Yu et al.

(10) Patent No.: US 7,237,940 B2
(45) Date of Patent: Jul. 3, 2007

(54) LIGHT GUIDE PLATE WITH SUBWAVELENGTH GRATING AND BACKLIGHT MODULE USING THE SAME

(75) Inventors: Tai-Cherng Yu, Tu-Cheng (TW); Charles Leu, Fremont, CA (US); Ga-Lane Chen, Fremont, CA (US)

(73) Assignee: Hon Hai Precision Industry Co. Ltd., Tu-Cheng, Taipei Hsien (TW)

( * ) Notice: Subject to any disclaimer, the term of this patent is extended or adjusted under 35 U.S.C. 154(b) by 48 days.

(21) Appl. No.: 11/021,970

(22) Filed: Dec. 23, 2004

(65) Prior Publication Data

US 2005/0185915 A1 Aug. 25, 2005

(30) Foreign Application Priority Data

Feb. 19, 2004 (CN) .................... 2004 1 0015442

(51) Int. Cl.
*F21V 8/00* (2006.01)

(52) U.S. Cl. .............. 362/621; 359/558; 359/559; 359/563; 359/566; 359/569; 359/572; 362/615

(58) Field of Classification Search .......... 362/621, 362/615; 372/43; 359/599, 559
See application file for complete search history.

(56) References Cited

U.S. PATENT DOCUMENTS

| 6,139,163 A * | 10/2000 | Satoh et al. ................ 362/612 |
| 6,266,473 B1 * | 7/2001 | Saccomanno et al. ....... 385/140 |
| 2002/0003661 A1 * | 1/2002 | Nakai .......................... 359/569 |
| 2004/0021945 A1 | 2/2004 | Tompkin et al. |

OTHER PUBLICATIONS

Omori, Shigeto et al. "Illumination by subwavelength grating with antireflection effect," 2001, Lithographic Micromaching Techniques for Optical Component Fabrication, SPIE vol. 4440, 285-292.*

* cited by examiner

*Primary Examiner*—Renee Luebke
*Assistant Examiner*—Mary Zetti
(74) *Attorney, Agent, or Firm*—Jeffrey T. Knapp

(57) ABSTRACT

A light guide plate (30) has a light incident surface (305) for receiving light, a light emitting surface (301) for emitting light, a bottom surface (303) opposite to the light emitting surface, and side surfaces (307, 309, 311). A subwavelength grating (302) is formed on the light incident surface for diffracting the light. The subwavelength grating is a zeroth-order grating which covers a wide wavelength band and diffracts the light into zeroth-order waves. So that the light guide plate has a high light utilization efficiency and yields high uniformity of outgoing light.

20 Claims, 4 Drawing Sheets

LIGHT GUIDE PLATE WITH SUBWAVELENGTH GRATING AND BACKLIGHT MODULE USING THE SAME

BACKGROUND OF THE INVENTION

1. Field of the Invention

The present invention relates to a light guide plate utilizing a subwavelength grating for controlling light transmission, and a backlight module for a liquid crystal display using such a light guide plate.

2. Description of Prior Art

Liquid crystal displays (LCDs) commonly use a backlight module to provide illumination. Referring to FIG. 6, a conventional backlight module includes a light source 101, a light guide plate 105, a reflective plate 103, a diffusion plate 107 and a prism plate 109. The light source 101 is typically a cold cathode fluorescent lamp (CCFL). The light guide plate 105 distributes light beams from the light source 101, to provide substantially planar illumination to the LCD.

Light beams typically enter the light guide plate 105 at a light incident surface. The light beams may propagate between a bottom surface and a light emitting surface toward an opposite end surface of the light guide plate 105 by total internal reflection, or may be output through the light emitting surface directly. Further, the bottom surface includes structures such as dots formed thereon or facets cut therein and arranged in a pattern. Light beams encountering any of these structures are diffusely or specularly reflected, so that they are emitted through the light emitting surface. However, when the light beams enter the light guide plate 105 through the light incident surface, part of the light beams are reflected by the light incident surface and lost. This reduces the light utilization efficiency of the light guide plate 105.

Referring to FIG. 7, Chinese Pat. No. 02249983 issued on Nov. 19, 2003 discloses a light guide plate (designated with the numeral 2). The light guide plate 2 comprises a substrate 20 having a light incident surface 21, a light emitting surface 22 adjacent to the light incident surface 21, a bottom surface 23 opposite to the light emitting surface 22, and side surfaces 24, 25 and 26. The light incident surface 21 and the light emitting surface 22 are provided with anti-reflection films (not labeled), and the bottom surface 23 and the side surfaces 24, 25 and 26 are provided with reflective films (not labeled). When light beams from a light source (not shown) are incident on the light incident surface 21 of the light guide plate 2, most of the light beams pass through the light incident surface 21, and relatively few light beams are reflected by the light incident surface 21. This reduces loss of light and enhances the light utilization efficiency of the light guide plate 2.

However, the light guide plate 2 has the following disadvantages and shortcomings. Firstly, the anti-reflection film is based on the principle of multi-light interference, and therefore can only provide anti-reflection in a narrow wavelength band. That is, light outside the narrow wavelength band is still reflected by the anti-reflection film. Thus the anti-reflection film has limited efficacy in reducing loss of light at the light incident surface 21. Secondly, the light incident surface 21 is generally closely adjacent to the light source, which may for example be a CCFL. When operating, the light source produces heat, which raises a temperature of the anti-reflection film. As a result, the reflection capability of the anti-reflection film is reduced. Thirdly, the anti-reflection film merely allows light beams to pass therethrough, but does not scatter the light beams. This can result in dark regions (not shown) being created on the light emitting surface 22 close to the light incident surface 21. That is, the illumination provided by the light emitting surface 22 is not uniform.

It is desired to provide a backlight module having a light guide plate which overcomes the above-described problems.

SUMMARY OF THE INVENTION

An object of the present invention is to provide a light guide plate which has a high light utilization efficiency and which yields high uniformity of outgoing light.

Another object of the present invention is to provide a backlight module utilizing the above-described light guide plate.

A light guide plate of the present invention comprises a light incident surface for receiving light beams, a light emitting surface for emitting light beams, and a bottom surface opposite to the light emitting surface. The light incident surface has a subwavelength grating formed thereon. The subwavelength grating includes first portions and second portions arranged according to a predetermined grating period.

The subwavelength grating operates as an anti-reflection structure. The subwavelength grating is effective for incident light over a wide wavelength band, and can work normally under high temperature conditions. Therefore the efficiency of light utilization is improved.

Furthermore, the subwavelength grating not only transmits light beams, but also scatters the light beams. Therefore dark regions are not created in the light guide plate, and high uniformity of outgoing light is achieved.

Other objects, advantages, and novel features of the present invention will become more apparent from the following detailed description when taken in conjunction with the accompanying drawings, in which:

DETAILED DESCRIPTION OF THE INVENTION

Figure 1:
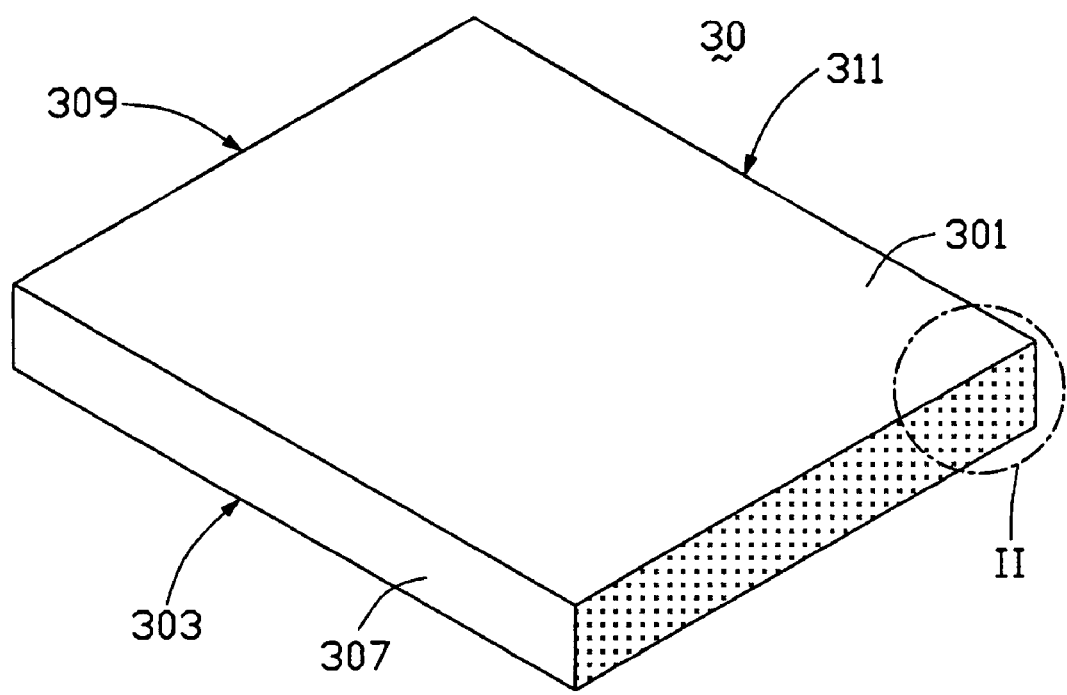
FIG. 1 is a schematic, isometric view of a light guide plate according to a first embodiment of the present invention.
Figure 2:
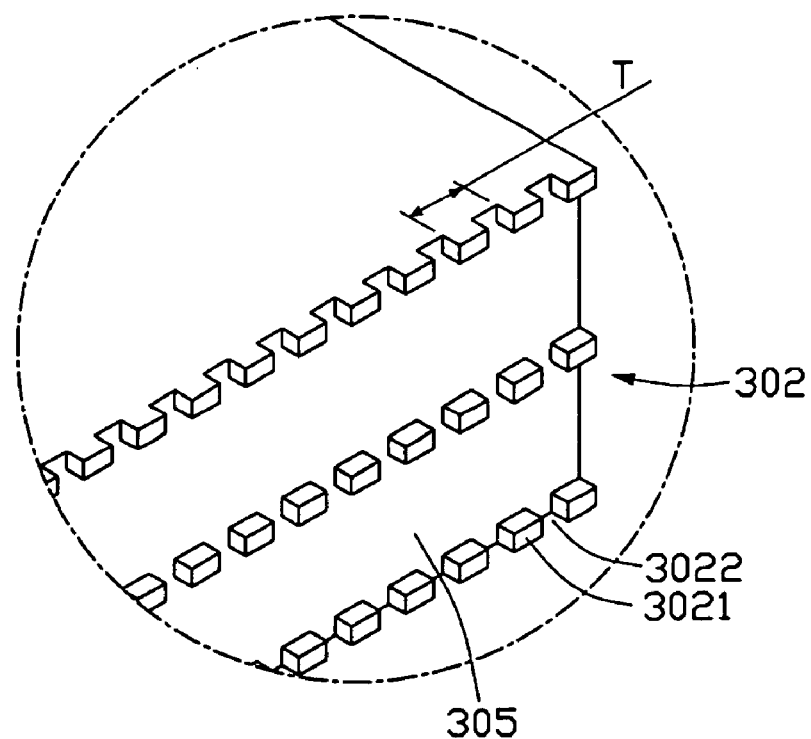
FIG. 2 is an enlarged view of a circled portion II of FIG. 1.

Referring to FIGS. 1 and 2, a light guide plate 30 according to the first embodiment of the present invention is shown. The light guide plate 30 comprises a light incident surface 305, a bottom surface 303 perpendicular to the light incident surface 305, a light emitting surface 301 opposite to the bottom surface 303, and a plurality of side surfaces 307, 309 and 311. A subwavelength grating 302 is formed on the light incident surface 305. The light incident surface 305 receives light beams from a light source (not shown) adjacent thereto, and the light emitting surface 301 emits the light beams for illuminating a liquid crystal display panel (not shown).

In the preferred embodiment, the light guide plate 30 is made of polymethyl methacrylate (PMMA) resin. Alternatively, transparent glass or another kind of synthetic resin may be used to make the light guide plate 30.

A plurality of diffusion dots (not shown) are formed on the bottom surface 303 of the light guide plate 30, to make the light beams emit uniformly from the light emitting surface 301.

The subwavelength grating 302 is a two-dimensional grating, which is molded into the light incident surface 305. The subwavelength grating 302 comprises a plurality of first portions 3021 and a plurality of second portions 3022 which are arranged at a grating period T. The first portions 3021 are protrusions protruding from the light incident surface 305. The second portions 3022 are disposed between the first portions 3021, and define valleys that each have a substantially rectangular cross-section. Each of the first portions 3021 also has a rectangular cross-section, corresponding to the cross-sections of the valleys. The first portions 3021 are made of the same material as that of the body of the light guide plate 30. A refractive index of the second portions 3022 is the same as that of air.

The period T of the subwavelength grating 302 satisfies the expression T<0.5λ, wherein λ is a wavelength of the light beams emitted from the light source. That is, the subwavelength grating 302 is a zeroth-order grating. In the present invention, the refractive indexes of the first portions 3021, the second portions 3022, the light guide plate and the incident medium (air) satisfy the following expression: $n_2 = n_{2g} > n_1 = n_{1g}$, wherein $n_2$, $n_{2g}$, $n_1$ and $n_{1g}$ are refractive indexes of the body of the light guide plate 30, the first portions 3021, the incident medium and the second portions 3022, respectively.

When the light beams propagate through the subwavelength grating 302, the light beams are diffracted forward and backward, to form front diffraction waves and back diffraction waves. Because the subwavelength grating 302 is a zeroth-order grating, it only propagates the zeroth-order diffraction waves. Therefore, based on diffraction theory, the back diffraction waves can be eliminated by adjusting the period T and the shape of the first portions 3021. If this is done, almost all the incident light beams are transmitted through the light incident surface 305, thereby enhancing the efficiency of light utilization.

The subwavelength grating 302 is effective over a wider wavelength band than a conventional anti-reflection film. Light beams in this wider wavelength band can be diffracted and transmitted through the light incident surface 305, thereby enhancing the light utilization efficiency. Furthermore, when the light beams propagate through the subwavelength grating 302, the light beams are diffracted and distributed uniformly through the light incident surface 305 in such a way that dark regions on the light emitting surface 301 are eliminated. Accordingly, the light guide plate 30 yields high uniformity of outgoing light emitted from the light emitting surface 301. Moreover, the subwavelength grating can work normally under high temperature conditions.

Figure 3:
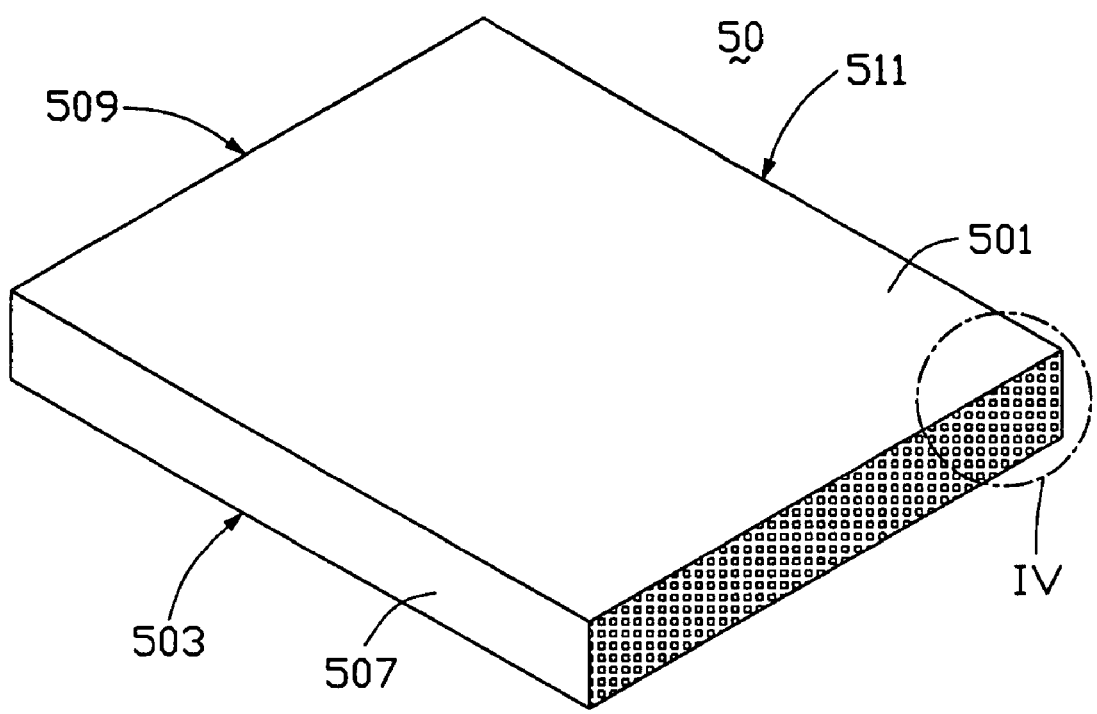
FIG. 3 is a schematic, isometric view of a light guide plate according to a second embodiment of the present invention.
Figure 4:
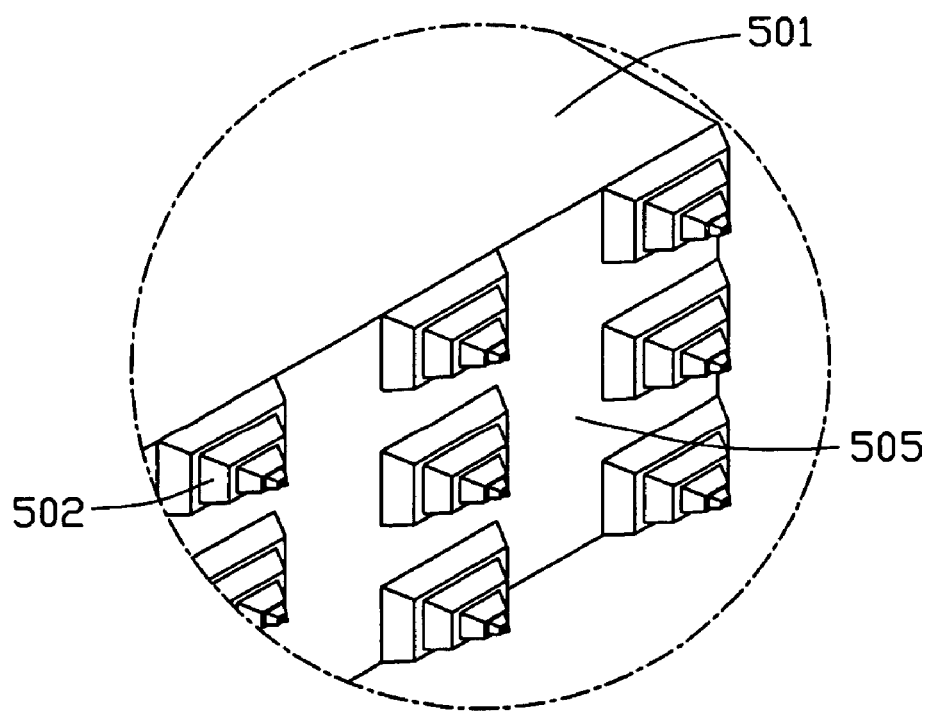
FIG. 4 is an enlarged view of a circled portion IV of FIG. 3.

Referring to FIGS. 3–4, a light guide plate 50 according to the second embodiment of the present invention is similar to the light guide plate 30. The light guide plate 50 comprises a light emitting surface 501, a bottom surface 503, a light incident surface 505, and side surfaces 507, 509 and 511. The light incident surface 505 has a two-dimensional subwavelength grating 502 comprising first portions (not labeled) and second portions (not labeled). The first portions have a substantially stepped pyramidal shape.

Figure 5:
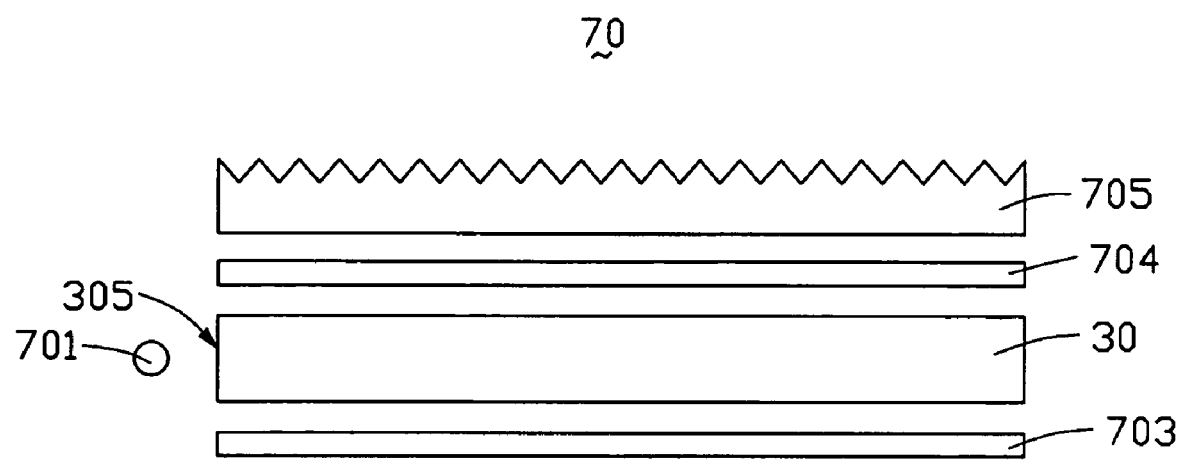
FIG. 5 is a schematic, exploded side view of a backlight module according to the present invention.
Figure 6:
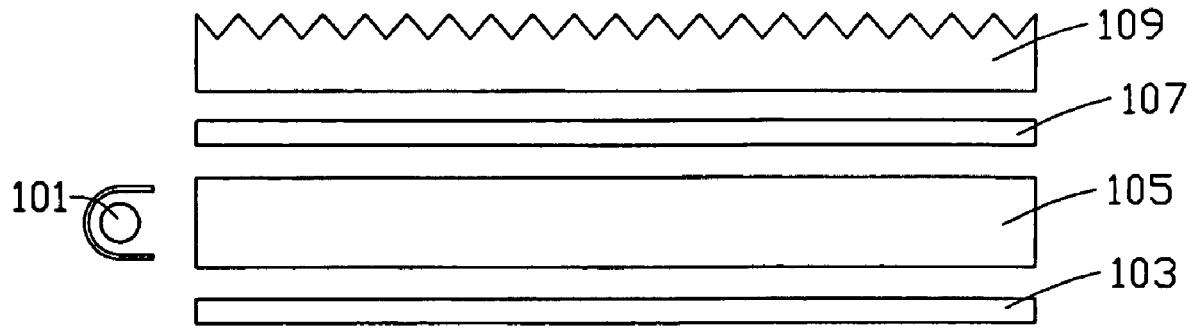
FIG. 6 is a schematic, exploded side view of a conventional backlight module.
Figure 7:
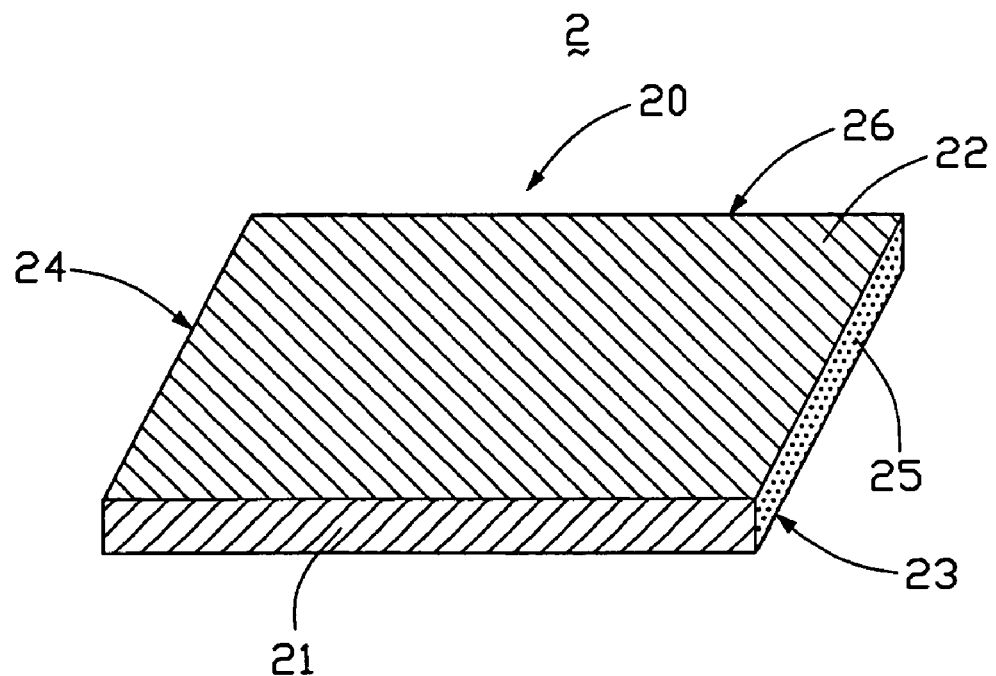
FIG. 7 is a schematic, isometric view of a conventional light guide plate.

Referring to FIG. 5, a backlight module 70 comprises a light source 701, the light guide plate 30, a diffusion plate 704, a prism plate 705 and a light reflective plate 703. The light source 701 is a CCFL, and is disposed adjacent to the light incident surface 305 of the light guide plate 30.

In an alternative embodiment of the present invention, the subwavelength grating can be a one-dimensional grating.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate configured to be optically connected to a light source, the light guide plate comprising:
   a light incident surface configured for being directly illuminated by light beams emitted from the light source;
   a light emitting surface for emitting the light beams; and
   a bottom surface opposite to the light emitting surface and perpendicular to the light incident surface;
   wherein the light incident surface has a subwavelength grating formed thereon, the subwavelength grating configured for diffracting the light beams forward and backward to form front diffraction waves and back diffraction waves.

2. The light guide plate as claimed in claim 1, wherein the subwavelength grating is a zeroth-order grating.

3. The light guide plate as claimed in claim 2, wherein the subwavelength grating has a plurality of first portions and a plurality of second portions arranged at a predetermined grating period.

4. The light guide plate as claimed in claim 3, wherein the first portions are protrusions protruding from the light incident surface, and the second portions define valleys between adjacent first portions.

5. The light guide plate as claimed in claim 4, wherein a refractive index of the second portions is the same as that of air, and a refractive index of the first portions is the same as that of a body of the light guide plate.

6. The light guide plate as claimed in claim 5, wherein the subwavelength grating is a one-dimensional grating.

7. The light guide plate as claimed in claim 5, wherein the subwavelength grating is a two-dimensional grating.

8. The light guide plate as claimed in claim 7, wherein the first portions have a generally rectangular shape or a stepped pyramidal shape.

9. The light guide plate as claimed in claim 1, wherein a plurality of diffusion dots is provided on the bottom surface of the light guide plate.

10. A light guide plate configured to be optically connected to a light source, the light guide plate comprising:
    a light incident surface configured for being directly illuminated by light beams emitted from the light source;
    a light emitting surface for emitting the light beams; and
    a bottom surface opposite to the light emitting surface and perpendicular to the light incident surface;
    wherein the light incident surface has a grating formed thereon, the grating is configured for diffracting the light beams forward and backward to form front diffraction waves and back diffraction waves, and a period of the grating is less than a wavelength of light beams propagating trough the grating.

11. The light guide plate as claimed in claim 10, wherein the period of the grating is less than a half wavelength of the light beams propagating through the grating.

12. The light guide plate as claimed in claim 11, wherein the grating comprises a plurality of first portions and a plurality of second portions arranged according to the period of the grating.

13. The light guide plate as claimed in claim 12, wherein a refractive index of the second portions is the same as that of air, and a refractive index of the first portions is the same as that of a body of the light guide plate.

14. A light guide plate configured to be optically connected to a light source, the light guide plate comprising:
 a light incident surface configured for being directly illuminated by light beams emitted from the light source;
 a light emitting surface for emitting light beams; and
 a bottom surface opposite to the light emitting surface and perpendicular to the light incident surface;
 wherein the light incident surface has a subwavelength grating, and when the light beams propagate through the subwavelength grating, substantially all the light beams are diffracted into zeroth-order diffraction waves tat pass through the light incident surface.

15. A backlight module, comprising:
 a light source; and
 a light guide plate optically connected to the light source, the light guide plate comprising a light incident surface directly illuminated by light beams emitted from the light source, and a light emitting surface for emitting the light beams, and a bottom surface opposite to the light emitting surface and perpendicular to the light incident surface, the light incident surface having at least one array of subwavelength gratings with first protruding portions therein, the at least one array of subwavelength gratings configured for diffracting the light beams forward and backward to form front diffraction waves and back diffraction waves, and a pitch between every two first portions of the subwavelength gratings being less than a predetermined wavelength of the light beams.

16. The backlight module as claimed in claim 15, wherein a period of the subwavelength grating, used to measure the pitch between every two first portions, is less tan a half wavelength of the light beams received from the light source.

17. The backlight module as claimed in claim 16, wherein the subwavelength grating comprises a plurality of the first portions and a plurality of second portions alternately arranged therein according to the period of the subwavelength grating.

18. The backlight module as claimed in claim 17, wherein a refractive index of the second portions is the same as that of air, and a refractive index of the first portions is the same as that of a body of the light guide plate.

19. The backlight module as claimed in claim 16, wherein the subwavelength grating is a substantially two-dimensional grating.

20. The backlight module as claimed in claim 15, wherein the first portions have a rectangular shape or a stepped pyramidal shape.

* * * * *